(12) United States Patent
Mann et al.

(10) Patent No.: US 8,730,791 B2
(45) Date of Patent: May 20, 2014

(54) AIRCRAFT COMMUNICATION SYSTEM

(75) Inventors: Olivier Mann, Reze (FR); Juan Lopez, Grenade (FR); Benoit Berthe, Ramonville Saint Agne (FR)

(73) Assignee: AIRBUS Operations S.A.S., Toulouse (FR)

( * ) Notice: Subject to any disclaimer, the term of this patent is extended or adjusted under 35 U.S.C. 154(b) by 227 days.

(21) Appl. No.: 12/915,517

(22) Filed: Oct. 29, 2010

(65) Prior Publication Data

US 2011/0103268 A1 May 5, 2011

(30) Foreign Application Priority Data

Nov. 5, 2009 (FR) ...................................... 09 57822

(51) Int. Cl.
*G01R 31/08* (2006.01)
(52) U.S. Cl.
USPC .......................................... 370/217; 370/276
(58) Field of Classification Search
USPC .................................. 370/276, 217, 257, 390
See application file for complete search history.

(56) References Cited

U.S. PATENT DOCUMENTS

| | | | |
|---|---|---|---|
| 2003/0147377 A1* | 8/2003 | Saint Etienne et al. | 370/351 |
| 2004/0218554 A1* | 11/2004 | Saint Etienne et al. | 370/276 |
| 2005/0086576 A1* | 4/2005 | Yokosato et al. | 714/776 |
| 2009/0060531 A1* | 3/2009 | Biegert et al. | 398/214 |
| 2010/0183009 A1* | 7/2010 | Baratakke et al. | 370/392 |
| 2011/0228765 A1* | 9/2011 | Yukie et al. | 370/352 |

FOREIGN PATENT DOCUMENTS

WO   WO 2007/132107 A1   11/2007

OTHER PUBLICATIONS

Search Report issued Jun. 28, 2010 in French Patent Application No. FA 733787 (with English translation of Category of Cited Documents).
Richard L. Alena, et al., "Communications for Integrated Modular Avionics", Aerospace Conference, 2007 IEEE, XP031214239, Mar. 3, 2007, pp. 1-18.

* cited by examiner

*Primary Examiner* — Yemane Mesfin
*Assistant Examiner* — Henry Baron
(74) *Attorney, Agent, or Firm* — Oblon, Spivak, McClelland, Maier & Neustadt, L.L.P.

(57) ABSTRACT

An aircraft communication system includes primary and secondary networks. The system also includes an interconnection gateway with a filtered interface connected to only one of the primary and secondary networks, and an unfiltered interface connected to the other network. The filtered interface includes first incoming and outgoing buffers, a memory, and a selector. The unfiltered interface includes second incoming and outgoing buffers. The second incoming buffer sends all frames received from the other network to the first outgoing buffer for distribution through the only one network. The selector selects common data frames corresponding to virtual link identifiers in a stored list and copies only the selected common data frames from the first incoming buffer to the second outgoing buffer of the unfiltered interface for distribution through the other one of the networks.

10 Claims, 6 Drawing Sheets

AIRCRAFT COMMUNICATION SYSTEM

TECHNICAL FIELD

The present invention generally concerns aircraft communication systems.

STATE OF THE PRIOR ART

In the past, aircraft equipment used communications of point-to-point type with direct physical links between items of equipment. For example, a computer could be connected via individual links with a plurality of other computers and/or controllers.

This type of communication may be acceptable for a relatively low number of equipment items. However, with the increased complexity of aeronautic systems, said point-to-point communication would require a very high number of direct links.

To solve this problem, a communication system is currently used comprising a network intended to serve as support for communication between the different digital devices on board an aircraft.

FIG. 5 illustrates a known architecture of a communication system 1100 allowing a plurality of items of equipment 1310, 1320, 1330, 1340, 1360 to transmit and/or receive data via a network 1300 of AFDX type (Avionics Full Duplex Switched Ethernet). These items of equipment may comprise controllers 1310, computers 1320, a monitoring terminal 1360, and optionally data concentrators 1330 forming the interfaces between the AFDX network 1300 and analog links with sensors 1331 and/or actuators 1332.

It is recalled that the AFDX network, developed for avionic needs, is based on a switched Ethernet network. In a switched Ethernet network each terminal, whether source or destination, is individually linked to a frame switch 1351, 1352 and the switches are connected together via physical links. The AFDX network has recourse to the notion of a virtual link defined as a level 2 unidirectional path through the network 1300, originating from a source terminal and serving a destination or a plurality of destinations. A destination terminal of a virtual link is said to be subscribed to this link.

The AFDX network has been the subject of standardization under the Arinc 664 norm, part 7. A description of an AFDX network can notably be found in the document "AFDX protocol tutorial" available at the URL:

http://sierrasales.com/pdfs/AFDXTutorial.pdf and a presentation of virtual links can be found in FR-A-2 832 011 filed on behalf of the present applicant. It is simply recalled here that the AFDX network is full-duplex and deterministic.

By full-duplex is meant that each terminal can simultaneously transmit and receive frames over virtual links on the same physical link. The AFDX network is deterministic in that the virtual links have guaranteed characteristics in terms of bounded latency, physical flux segregation, bandwidth and bit rate. Each virtual link for this purpose has a reserved end-to-end pathway through the network. Data is transmitted in the form of IP packets encapsulated in Ethernet frames. Unlike conventional Ethernet switching, (using the Ethernet address of the destination), frame switching on an AFDX network uses a virtual link identifier included in the frame header. When a switch 1351 receives a frame on one of its input ports, it reads the virtual link identifier and from its forwarding table it determines the output port(s) on which the frame is to be transmitted. During transfer, the switches 1351, 1352 verify the integrity of the transmitted frames without requesting retransmission however if a frame is invalid: frames detected as containing an error are discarded. The frames transiting on a virtual link are numbered in sequence. On receipt, the destination terminal checks the integrity of the frame sequence.

However, the needs of aeronautics are dictated by particularly severe constraints of reliability and redundancy. In particular, it is essential to ensure the availability under all circumstances of certain types of data considered to be critical for piloting the aircraft. On this account, the connection architecture illustrated in FIG. 5 shows that for the extreme needs of safety, numerous direct links 1501 are maintained with emergency equipment 1510, 1520, 1530, 1540 in parallel with and independently of the AFDX network.

This architecture requires numerous wire connections and in addition, has the disadvantage of being heterogeneous and disordered and hence difficult to implement.

Another known communication system provides for the interconnecting of emergency equipment by means of a bus or a second network.

However, in this system there are also links of point-to-point type for common data between the equipment of the two networks. For example, for maintenance data or software updates, numerous individual links are maintained between the emergency equipment and the monitoring terminal 1360 connected to the AFDX network.

This again requires numerous, lengthy wire connections, which is detrimental to the weight breakdown of the aircraft.

The purpose of the present invention is therefore to propose a communication system having an architecture which allows a large number of major equipment items and emergency equipment to be connected in simple, secure manner and which is able to respond to a generic fault without having the aforementioned shortcomings.

DISCLOSURE OF THE INVENTION

The present invention is defined by an aircraft communication system comprising:

a primary network of AFDX type intended to connect a plurality of primary equipment items, said primary equipment being physically connected to a switching device of the primary network, which allows communication between all these primary equipment items via virtual links, a secondary network dissimilar to said primary network whilst having the same protocol at frame level, said secondary network being intended to connect a plurality of secondary equipment items, said secondary equipment items being physically connected to a hub of the secondary network which allows communication between all these secondary equipment items, and an interconnection gateway between said primary and secondary networks, intended to copy frames of common data bit-by-bit originating from one of said primary and secondary networks, for distribution of this data through the other of said primary and secondary networks, so that this common data is shared by the two networks.

Advantageously the interconnection gateway comprises:

a first interface intended to be connected to the primary network and comprising first incoming and outgoing buffers, a second interface intended to be connected to the secondary network and comprising second incoming and outgoing buffers, memory means to store a configuration table of a predetermined list of virtual link identifiers corresponding to common data, and selection means to select and copy the frames corresponding to common data in relation to the virtual link identifiers chosen in the configuration table.

According to one particular embodiment of the interconnection gateway, the memory means and the selection means are included in the first interface and/or the second interface, and in that the first and second interfaces are connected together via a connection bus.

According to another particular embodiment of the invention, the interconnection gateway is a partition in a computer belonging to said primary equipment, said computer comprising storage means corresponding to said memory means, and a processor corresponding to said selection means.

According to one variant, the interconnection gateway is a partition in a secondary computer belonging to said secondary equipment, said computer comprising storage means corresponding to said memory means, and a processor corresponding to said selection means.

Advantageously, the interconnection gateway is connected to the primary network and/or to the secondary network via an optical fibre link.

The primary network is an AFDX network and the secondary network is an EREBUS network.

Advantageously, the EREBUS network has recourse to virtual links, and each item of secondary equipment on receiving data frames from the hub which comprise virtual link identifiers in their headers, only takes into consideration those frames belonging to virtual links to which it is subscribed.

According to one variant, the EREBUS network has recourse to data frames comprising labels in their headers giving information on the type of data in each frame, and each item of secondary equipment on receiving data frames containing labels from the hub only takes into consideration those frames containing data of interest for such item.

Data common to the two networks may comprise: maintenance data, time-stamping data, software updates and operational data.

Finally, the invention concerns an aircraft comprising a communication system such as defined above.

BRIEF DESCRIPTION OF THE DRAWINGS

Other characteristics and advantages of the invention will become apparent on reading preferred embodiments of the invention given with reference to the appended figures amongst which.

DETAILED DESCRIPTION OF PARTICULAR EMBODIMENTS

Figure 1:
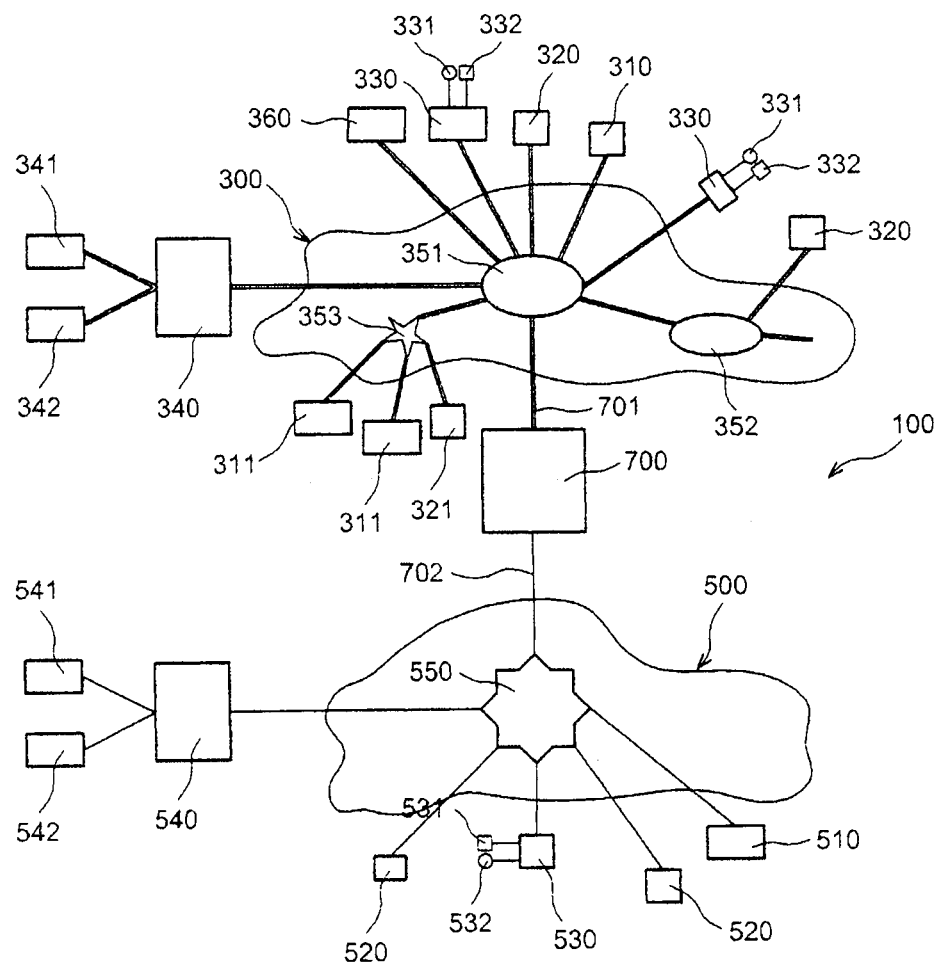
FIG. 1 schematically illustrates a communication system in an aircraft according to the invention.

FIG. 1 schematically illustrates the architecture of an aircraft communication system 100 according to one embodiment of the invention. The communication system in general is associated with elementary control systems managing particular functions of the aircraft.

According to the invention, the communication system 100 comprises a primary network 300 of AFDX type and a secondary network 500. The primary network 300 is intended to connect a plurality of primary equipment items 310, 311, 320, 321, 330, 340, 360 and the secondary network 500 is intended to connect a plurality of secondary equipment items 510, 520, 530, 540.

Advantageously, the secondary network 500 is chosen to be dissimilar to the primary network 300 to provide against a generic (or common mode) fault due to the primary network 300 whilst having the same protocol at frame level as the latter to simplify data exchanges between the two networks 300 and 500.

The primary equipment items 310, 311, 320, 321, 330, 340, 360 are source and/or destination terminals subscribed to the primary network 300 and are physically connected to a switch device 351, 352, 353 of the primary network 300 which allows communication between all these items of equipment via virtual links.

In general, the primary network 300 may comprise a plurality of frame switches 351 and 352 arranged at communication nodes of the aircraft, and optionally a plurality of micro-switches 353 (of which only one is shown here). The micro-switch 353 allows the local processing of frames originating from or destined for a cluster of terminals 311, 321 subscribed to the primary network 300. More precisely, the micro-switch 353 has a first port connected to switch 351 and a plurality of second ports connected to the different items of equipment 311, 321 subscribed to the network 300. On the downlink i.e. for frames received by the first port destined for a subscriber, the micro-switch 353 acts as hub i.e. a frame incident on the first port is repeated on all the second ports. On the other hand, on the uplink, i.e. for the frames transmitted by the different subscriber terminals 311, 321, the micro-switch 353 polls the second ports in turn and empties their respective buffers on the first port, following a mechanism of round robin type.

In the illustrated example, the switching device of the primary network 300 comprises two frame switches 351 and 352 and a micro-switch 353 connected to switch 351. For simplification purposes, only the equipment connected to frame switch 351 and to the micro-switch 353 are shown. For example, such equipment comprises controllers 310, 311, computers 320, 321, a man-machine interface 340 connected to display means 341 and piloting means 342, a configuration or monitoring terminal 360, and optionally data concentrators 330 forming the interfaces between the AFDX network 300 and analog links with sensors 331 and/or actuators 332.

For example, a sensor 331 may provide measurements in analog form to the corresponding data concentrator 330 and the latter formats the same in AFDX message form for transmittal to the dedicated computer 320 via the switch 351. Similarly, the computer 320 may transmit an instruction to a control unit (not shown) of an actuator 332 via the data concentrator 330 and also via the AFDX network. Evidently, the sensors 331 and/or actuators may also be analogically linked directly to their dedicated computer and/or controller.

The controller 310 may also transmit data to a computer 320 via the frame switch 351. Similarly, the computer 320 may exchange messages with a data concentrator 330, a man-machine interface 340, or the monitoring terminal 360 also via the frame switch 351.

The secondary equipment items 510, 520, 530, 540 are source and/or destination terminals subscribed to the secondary network 500 and are physically linked together by at least one hub 550 of the secondary network 500. This or these hubs allow communication between all the secondary equipment items 510, 520, 530, 540.

The example in FIG. 1 shows that the secondary equipment comprises a secondary controller 510, a secondary computer 520, a secondary man-machine interface 540 connected to secondary display means 541 and piloting means 542, and optionally a secondary data concentrator 530 forming the interfaces between the secondary network 500 and analog links with secondary sensors 531 and/or actuators 532. All the secondary equipment items 510, 520, 530, 540 are connected to the hub 550 of the secondary network 500.

The hub 550 has a plurality of identical ports connected to the different secondary equipment items (or terminals) 510, 520, 530, 540 subscribed to the secondary network 500. In the illustrated example, a first port is connected to the secondary controller 510, second and third ports are connected to first and second secondary computers 520, a fourth port is connected to a secondary data concentrator 530, and finally a fifth port is connected to the secondary man-machine interface 540.

Therefore, a frame incident on the hub 550 from a secondary computer 520 for example and destined for a subscriber is repeated on all the ports. The receiving subscriber terminals 510, 520, 530, 540 determine whether they are the destinations thereof, ignore it in the negative and take it into consideration in the affirmative.

Additionally, for frames transmitted by the different subscriber terminals 510, 520, 530, 540, the hub 550 polls the ports in turn and empties the incoming buffer of each port on all the ports following a mechanism of round robin type, thereby ensuring equitable sharing of the bandwidth.

The connection between the primary network 300 and the secondary network 500 is ensured by an interconnection gateway 700 which is intended to copy bit-by-bit the common data frames originating from either of the primary 300 and secondary 500 networks for their distribution through the other of these two networks, for the purpose of causing this common data to be shared by the two networks 300 and 500.

Advantageously, the primary network 300 and the interconnection gateway 700 can be connected together by means of an optical fibre link 701 allowing the two networks to be electrically uncoupled. Similarly, the interconnection gateway 700 can also be linked to the secondary network 500 by means of an optical fibre link 702.

Data common to the two networks 300 and 500 may, for example, comprise maintenance data, time-stamping data, configuration data, software updates, and operational data allowing increased operational performance, such as the sharing of data derived from the sensors and optionally other types of data. This common data may originate from a terminal (e.g. the configuration or monitoring terminal 360) subscribed to the primary network 300.

The interconnection gateway 700 according to the invention therefore allows common data to be distributed between the two networks in simple, swift and secure manner.

More particularly, the secondary network 500 can therefore provide against a generic fault in the primary network 300 whilst forming a single network with the latter transparent to the flow of common data by means of the interconnection gateway 700. It will be appreciated that the invention does not require direct links with the secondary equipment items 510, 520, 530, 540 or with costly, complex gateways.

However, it will be noted that some primary equipment may optionally have a link with the secondary network 500 to cover a simple fault of their switch 351.

Also, for reasons of availability, the connection between the primary network 300 and the secondary network 500 may evidently be ensured by several interconnection gateways 700.

The communication system 100 according to the invention therefore allows simplified wiring through the use of a single network for common service whilst reinforcing the security level by means of two segregated, dissimilar networks. In addition, this allows extended end-to-end monitoring of communications of the communication system using a protocol common to all the equipment.

Figure 2:
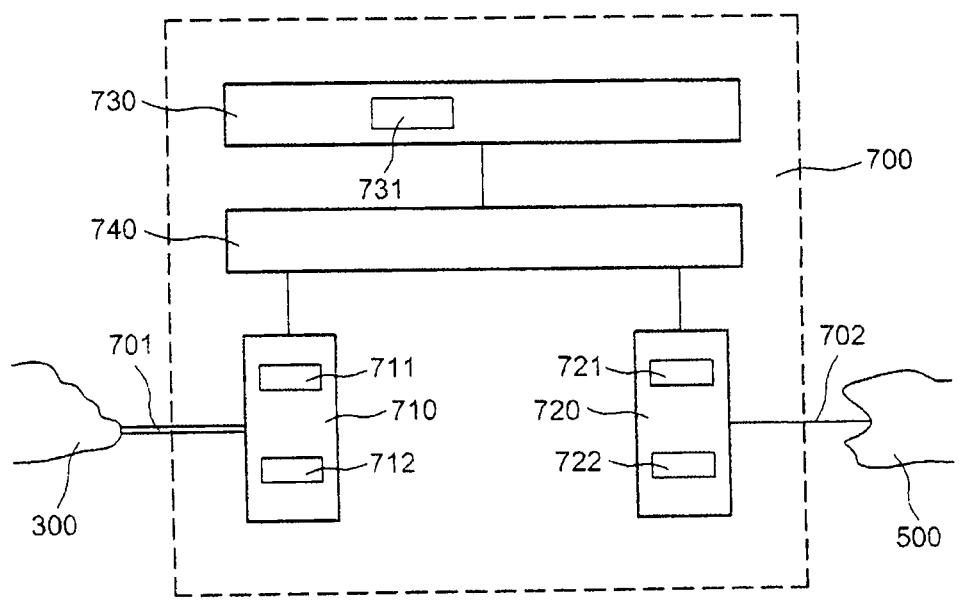
FIG. 2 schematically illustrates the architecture of an interconnection gateway which can advantageously be used in the system shown in FIG. 1.

FIG. 2 illustrates an example of the architecture of an interconnection gateway 700 which may be used in the aircraft communication system 100 of the invention.

The interconnection gateway 700 comprises a first interface 710 comprising first incoming 711 and outgoing 712 buffers, a second interface 720 comprising second incoming 721 and outgoing 722 buffers, storage means 730, and selection means 740.

The first interface 710 is intended to be connected via link 701 (e.g. optical fibre) to the frame switch 351 of the primary network 300, and the second interface 720 is intended to be connected via link 702 (e.g. optical fibre) to the hub 550 of the secondary network 500 (see FIG. 1).

The storage means 730 allow the storing of a configuration table 731 of a predetermined list of virtual link identifiers corresponding to the common data.

Each frame effectively comprises a virtual link identifier in its header which allows identification of the directional pathway taken by this frame. Therefore, the configuration table 731 enables the interconnection gateway 700 to copy the frames whose virtual link identifiers are identified in this table 731.

More precisely, the selection means 740 select and copy the frames corresponding to the data common to the two networks 300 and 500 in relation to the virtual link identifiers they contain and which are chosen from the configuration table 731.

Since the primary 300 and secondary 500 networks have the same protocols at frame level, the interconnection gateway 700 needs only to copy the common data bit-by-bit without any protocol conversion. The interconnection gateway 700 is therefore quick and easy to implement.

Figure 3A:
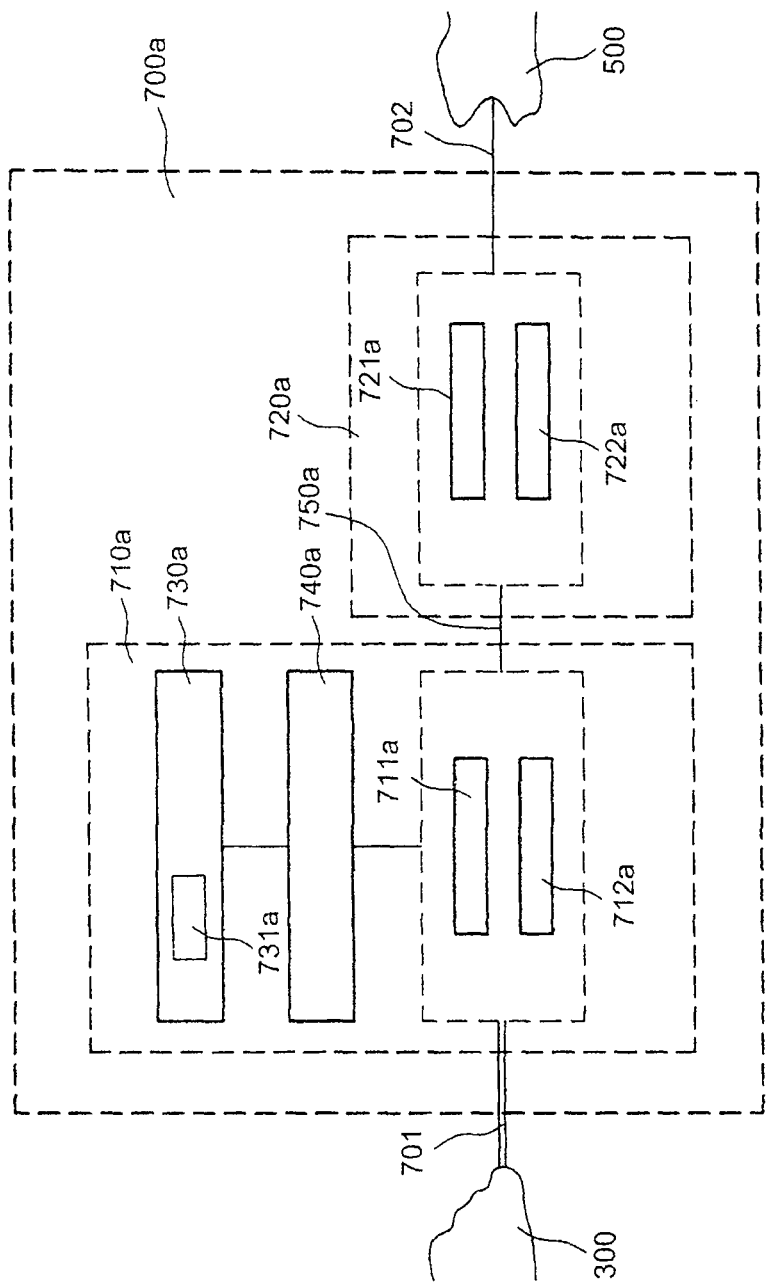
FIGS. 3A and 3B schematically illustrate different variants of the interconnection gateway shown in FIG. 2.
Figure 3B:
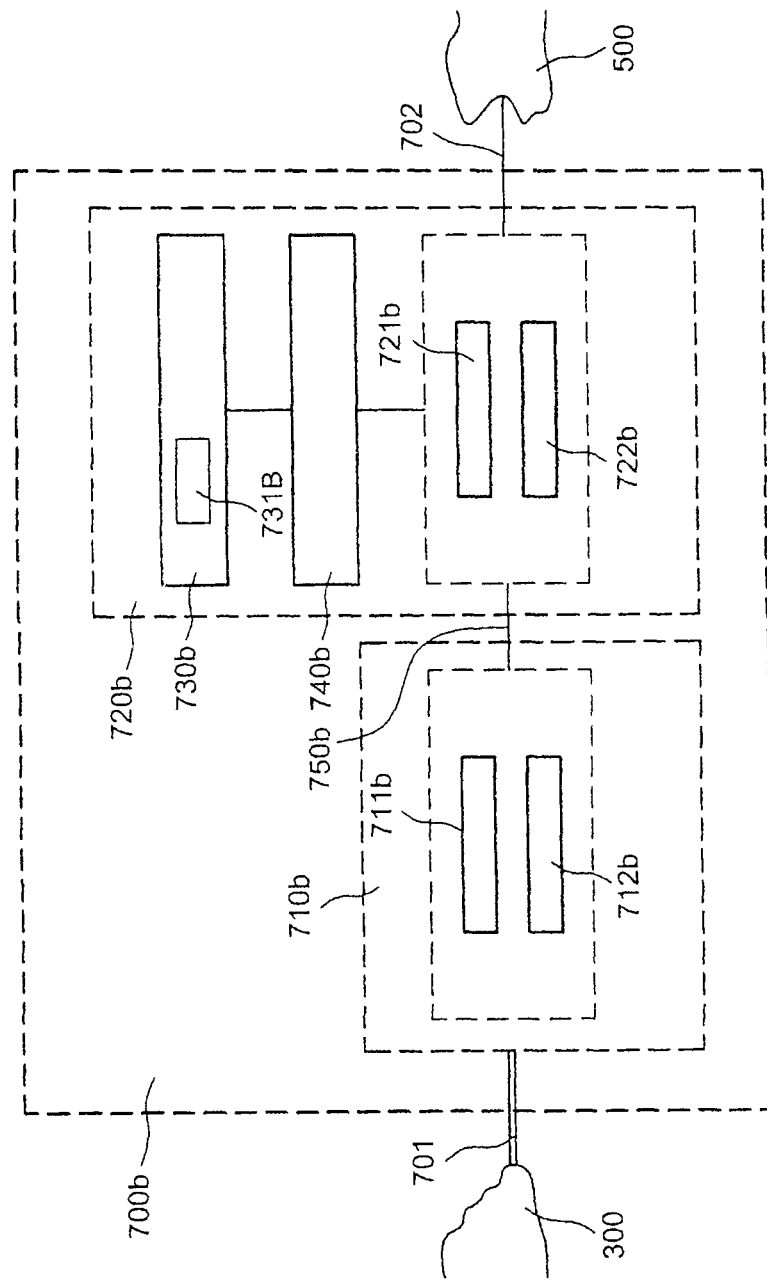

FIGS. 3A and 3B illustrate particular embodiments of the interconnection gateway shown in FIG. 2.

It will be noted that the data originating from the secondary network 500 is chiefly common data which can therefore be directly distributed through the primary network 300. Consequently, it is advantageous to arrange the selection means 740 on the side of the primary network 300.

FIG. 3A shows that the first interface 710*a* of the interconnection gateway 700*a*, in addition to the first incoming 711*a* and outgoing buffers 712*a*, also comprises a memory 730*a* (corresponding to the storage means) and a filter 740*a* (corresponding to the selection means).

On the other hand, the second interface 720*a* only comprises the second incoming 721*a* and outgoing 722*a* buffers. The first and second interfaces 710*a* and 720*a* are also connected together via a connection bus 750*a*.

Therefore, for flows of data originating from the primary network 300 (i.e. for frames received by the interconnection gateway 700*a* from the primary network 300), the incident frames are stored in the first incoming buffer 711*a* of the first interface 710*a*. The filter 740*a* eliminates the frames corresponding to a non-recognized virtual link (i.e. not listed in the configuration table 731*a* stored in the memory 730*a*) and hence only allows the frames corresponding to common data to pass towards the second outgoing buffer 722a of the second interface 720a. These frames are then distributed through the secondary network 500.

On the other hand, for data flows originating from the secondary network 500 (i.e. for frames received by the interconnection gateway 700a from the secondary network 500), the incident frames in the second incoming buffer 721a of the second interface 720a are sent directly to the first outgoing buffer 712a of the first interface 710a for their distribution through the primary network 300.

Optionally, in the event that the flows from the secondary network 500 comprise data other than common data, the filter 740a can also be in charge of eliminating those frames corresponding to virtual links not listed in the configuration table 731a. Therefore, the filter 740a, in one direction or in the other, only allows those frames to pass which correspond to common data.

FIG. 3B illustrates an interconnection gateway 700b according to another embodiment, comprising a first interface 710b comprising the first incoming 711b and outgoing 712b buffers, and a second interface 720b comprising the second incoming 721b and outgoing 722b buffers, a memory 730b (corresponding to the storage means) and a filter 740b (corresponding to the selection means). Similarly, the first and second interfaces 710b and 720b are connected together via a connection bus 750b.

The interconnection gateway 700b in FIG. 3B only differs from the one in FIG. 3A by the fact that the memory 730b and the filter 740b are arranged in the second interface 720b instead of the first interface 710b. Therefore, the selection of frames derived from the nominal network 300 or from the secondary network 500 takes place at the second interface 720b.

Evidently, it could also be envisaged to arrange the memory 730b and/or the filter 740b outside the interfaces 710b and 720b or even to arrange a filter in each interface.

FIGS. 3A and 3B therefore illustrate examples of an independent interconnection gateway 700a, 700b which allows simple connecting of the two networks 300 and 500 only allowing common data to pass in either direction.

According to other embodiments, the interconnection gateway 700 may be included, for example, in a computer 320 linked to the primary network 300 or even in a secondary computer 520 linked to the secondary network 500.

Figure 4:
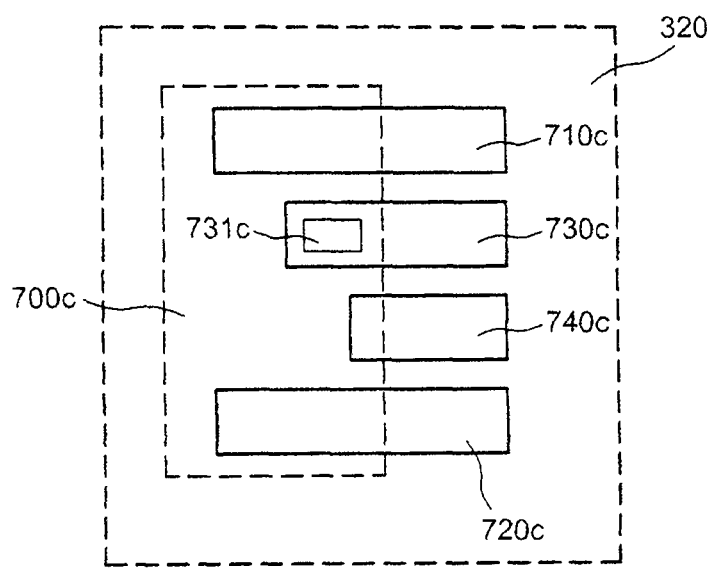
FIG. 4 illustrates another embodiment of the interconnection gateway shown in FIG. 2.
Figure 5:
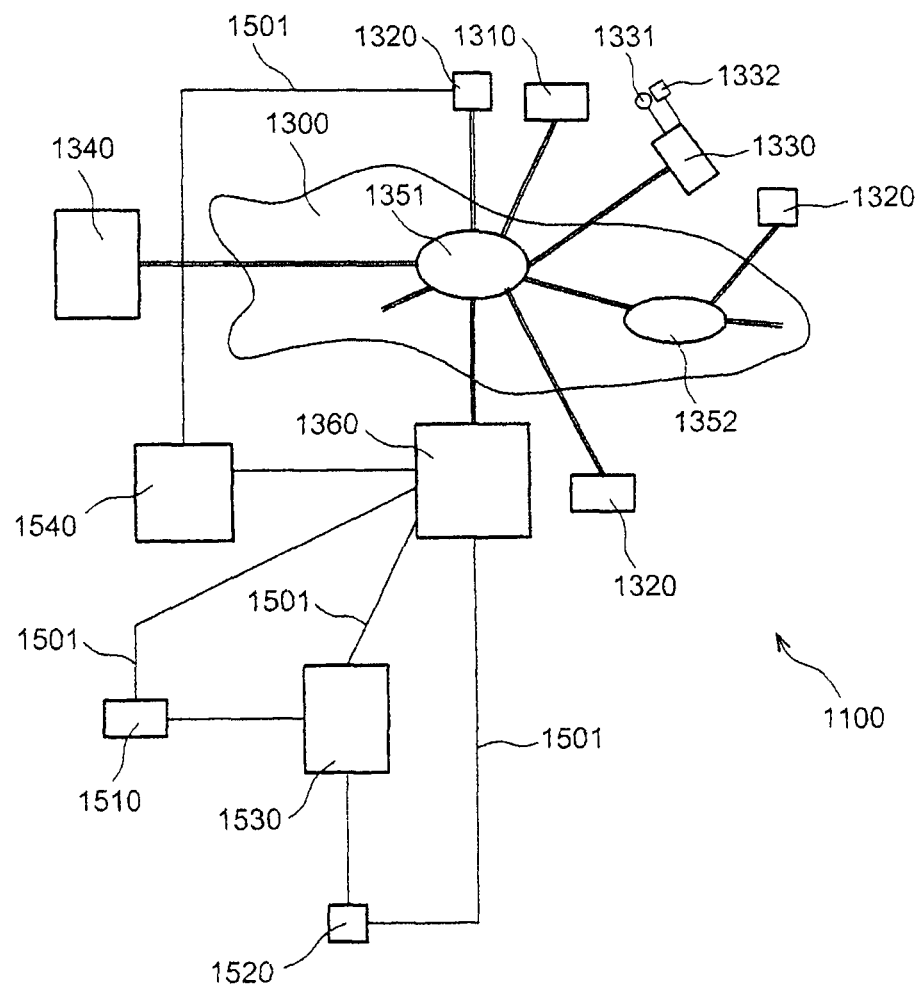
FIG. 5 schematically illustrates the architecture of an aircraft communication system known in the prior art.

FIG. 4 illustrates a computer 320 comprising interfaces 710c and 720c, storage means 730c and a processor 740c. According to this example, the interconnection gateway 700c is a partition (shown as a dotted line) in the computer 330.

Therefore, the interfaces 710c and 720c of the computer 330 correspond to the first and second interfaces 710 and 720 of the interconnection gateway 700, whilst the storage means 730c and the processor 740c inter alia ensure the respective functions of the memory means 730 and selection means 740 of the interconnection gateway 700.

The configuration table 731c is then stored in the storage means 730c of the computer 320 and the processor 740c is in charge of only allowing common data to pass in one direction or the other in relation to the virtual link identifiers and the configuration table 731c.

Advantageously, the computer may be linked to the primary network 300 and/or to the secondary network 500 by means of an optical fibre link which allows electric uncoupling of the two networks.

The computer 320, receiving common data from one of the two networks 300 and 500 quickly sends such data to the other network in simple, low-cost manner without any particular formatting or addressing processing. Additionally, it is not necessary to make provision for an additional node between the two networks 300 and 500. Also, it is not necessary to connect the first and second interfaces via one same bus.

Advantageously, the primary network 300 is an AFDX network and the secondary network 500 is an EREBUS network, as defined above.

As already mentioned, the AFDX network is based on a switched Ethernet network and has recourse to the notion of virtual links. An AFDX virtual link is characterized by a single transfer direction, a single source, one or more destinations, a predetermined bandwidth, maximum latency time between sender and receiver equipment irrespective of the behaviour of the remainder of the network, a fixed pathway through the network, and a single identifier.

The AFDX network is full-duplex and deterministic. It guarantees segregation of data and end-to-end transmission within a time that is shorter than the maximum latency time.

The EREBUS network is also based on Ethernet and more particularly on a physical layer of Ethernet.

The EREBUS network is also full-duplex, in other words each terminal can simultaneously transmit and receive frames.

More particularly, the EREBUS network is based on systematic repeating in which the data derived from a source terminal and received by the hub 550 is sent to all the subscriber terminals 510, 520, 530, 540 including to the source terminal which also receives the data it sent. When the hub 550 receives a frame on one of its input ports, this frame is repeated on all the ports including the port connected to the source terminal. The subscriber terminals 510, 520, 530, 540 receiving the frame then determine whether or not they are the destinations of this frame. In addition, the hub 550 polls the ports in turn to empty the frames transmitted by the different subscriber terminals 510, 520, 530, 540 for equitable sharing of the bandwidth.

According to one preferred embodiment of the invention, the EREBUS network has recourse to virtual links.

In this case, the hub 550 and the secondary equipment 510, 520, 530, 540 are configured to allow communication within the EREBUS network via virtual EREBUS links. Each item of secondary equipment, on receiving data frames from the hub 550 which contain virtual link identifiers in their headers, only takes into consideration those belonging to virtual links to which it is subscribed.

In other words, the hub 550 sends the data frames to all items of equipment. Then, it is the subscriber itself which, on receiving all the data frames, reads the virtual link identifiers included in the headers of the frames to select solely those which are associated with virtual links that are of interest for the subscriber.

Evidently, in this case, the interconnection gateway 700 may distribute common data between the two networks simply by copying bit-by-bit the common data frames originating from either one of the two networks.

According to another embodiment of the invention, the EREBUS network has recourse to data frames comprising labels in their headers, these labels giving information on the type of data contained in each frame.

As previously, the hub 550 sends data frames to all the equipment items and it is the subscriber itself which, on receiving all the data frames, reads the labels included in the frame headers so as only to take into consideration those frames containing data of interest to the subscriber.

In this case, the interconnection gateway 700 further comprises means to place the labels, associated with common data frames originating from the secondary network 500, into appropriate AFDX virtual links.

The advantage of using the EREBUS network as secondary network is therefore due to the fact that it is highly robust, adapted for use in avionics, and has a format compatible with the AFDX network whilst being sufficiently dissimilar to respond to a generic fault in the AFDX network.

The invention claimed is:

1. An aircraft communication system comprising:
   a primary network of AFDX type that connects a plurality of primary equipment items, said primary equipment items being physically connected to a switching device of the primary network which allows communication between all the primary equipment items via virtual links;
   a secondary network having a same protocol at a frame level as said primary network and having a different higher level protocol from said primary network at a level higher than said frame level, said secondary network is configured to connect a plurality of secondary equipment items, said secondary equipment items being connected to a hub of the secondary network which allows communication between all the secondary equipment items;
   an interconnection gateway that includes
      a filtered interface connected to only one of the primary network and the secondary network, the filtered interface including a first incoming buffer, a first outgoing buffer, a memory, and a selector,
      an unfiltered interface connected to the other one of the primary network and the secondary network and including a second incoming buffer and a second outgoing buffer,
      the second incoming buffer of the unfiltered interface is configured to copy all frames received from the other one of the primary network and the secondary network to the first outgoing buffer of the filtered interface for distribution through the only one of the primary network and the secondary network,
      the memory is configured to store a configuration table of a predetermined list of virtual link identifiers corresponding to common data that is distributed on the primary network and the secondary network according to the same protocol at the frame level and different protocols at the level higher than the frame level, and
      the selector is configured to select common data frames corresponding to the virtual link identifiers in the configuration table and copy only the selected common data frames from the first incoming buffer of the filtered interface to the second outgoing buffer of the unfiltered interface for distribution through the other one of the primary network and the secondary network;
   the second incoming buffer of the unfiltered interface is further configured to copy all frames received from the other one of the primary network and the secondary network to the first outgoing buffer of the filtered interface by a bit-by-bit copy at the frame level to be distributed on the only one of the primary network and the secondary network according to the same protocol at the frame level and a different protocol at the higher level than the frame level; and
   the selector is further configured to copy only the selected common data frames from the first incoming buffer of the filtered interface to the second outgoing buffer of the unfiltered interface by a bit-by-bit copy at the frame level to be distributed through the other one of the primary network and the secondary network according to the same protocol at the frame level and a different protocol at the higher level than the frame level.

2. The communication system according to claim 1, wherein the memory and the selector are included in the filtered interface and/or the unfiltered interface, and the filtered and unfiltered interfaces are connected together via a connection bus.

3. The communication system according to claim 1, wherein the interconnection gateway is a partition in a computer belonging to said primary equipment, said computer comprising a storage device corresponding to said memory and a processor corresponding to said selector.

4. The communication system according to claim 1, wherein the interconnection gateway is a partition in a secondary computer belonging to said secondary equipment, said secondary computer comprising a storage device corresponding to said memory and a processor corresponding to said selector.

5. The communication system according to claim 1, wherein the interconnection gateway is connected to the primary network and/or the secondary network via an optical fibre link.

6. The communication system according to claim 1, wherein the primary network is an AFDX network and the secondary network is an EREBUS network.

7. The communication system according to claim 6, wherein the EREBUS network has recourse to virtual links and each item of secondary equipment, on receiving data frames from the hub which contain virtual link identifiers in their headers, only takes into consideration data frames belonging to virtual links to which the respective item of secondary equipment is subscribed.

8. The communication system according to claim 6, wherein the EREBUS network has recourse to data frames comprising labels in their headers giving information on the type of data in each frame, and each item of secondary equipment on receiving data frames containing labels from the hub only takes into consideration data frames containing data of interest to the respective item of secondary equipment.

9. The communication system according to claim 1, wherein the data common to the two networks includes maintenance data, time-stamping data, software updates, and operational data.

10. An aircraft comprising:
    an aircraft communication system, the aircraft communication system including
       a primary network of AFDX type that connects a plurality of primary equipment items, said primary equipment items being physically connected to a switching device of the primary network which allows communication between all the primary equipment items via virtual links,
       a secondary network having a same protocol at a frame level as said primary network and having a different higher level protocol from said primary network at a level higher than said frame level, said secondary network is configured to connect a plurality of secondary equipment items, said secondary equipment items being connected to a hub of the secondary network which allows communication between all the secondary equipment items, and
       an interconnection gateway that includes
          a filtered interface connected to only one of the primary network and the secondary network, the filtered interface including a first incoming buffer, a first outgoing buffer, a memory, and a selector, an unfiltered interface connected to the other one of the primary network and the secondary network and including a second incoming buffer and a second outgoing buffer, the second incoming buffer of the unfiltered interface is configured to copy all frames received from the other one of the primary network and the secondary network to the first outgoing buffer of the filtered interface for distribution through the only one of the primary network and the secondary network, the memory is configured to store a configuration table of a predetermined list of virtual link identifiers corresponding to common data that is distributed on the primary network and the secondary network according to the same protocol at the frame level and different protocols at the level higher than the frame level, and the selector is configured to select common data frames corresponding to the virtual link identifiers in the configuration table and copy only the selected common data frames from the first incoming buffer of the filtered interface to the second outgoing buffer of the unfiltered interface for distribution through the other one of the primary network and the secondary network;

the second incoming buffer of the unfiltered interface is further configured to copy all frames received from the other one of the primary network and the secondary network to the first outgoing buffer of the filtered interface by a bit-by-bit copy at the frame level to be distributed on the only one of the primary network and the secondary network according to the same protocol at the frame level and a different protocol at the higher level than the frame level; and the selector is further configured to copy only the selected common data frames from the first incoming buffer of the filtered interface to the second outgoing buffer of the unfiltered interface by a bit-by-bit copy at the frame level to be distributed through the other one of the primary network and the secondary network according to the same protocol at the frame level and a different protocol at the higher level than the frame level.

* * * * *